United States Patent

Lang et al.

Patent Number: 5,873,633
Date of Patent: Feb. 23, 1999

[54] RETARDATION LOCK MEMBER FOR MOTOR VEHICLE SEAT COMPONENT

[75] Inventors: Ulf Lang; Anders Ekman, both of Trollhättan, Sweden

[73] Assignee: Lear Corporation, Southfield, Mich.

[21] Appl. No.: 946,828

[22] Filed: Oct. 8, 1997

[51] Int. Cl.⁶ .................................................. A47C 7/54
[52] U.S. Cl. .................. 297/411.32; 297/411.2
[58] Field of Search .......................... 297/411.38, 411.35, 297/411.3, 411.32, 115, 113, 216.1, 117, 411.2, 216.13, 216.14, 378.11, 378.12, 378.13, 332; 296/63, 65.01

[56] References Cited

U.S. PATENT DOCUMENTS

| | | |
|---|---|---|
| 2,917,107 | 12/1959 | Bloom et al. . |
| 3,168,346 | 2/1965 | Rei, Jr. . |
| 3,666,319 | 5/1972 | Moloney, Jr. . |
| 4,141,586 | 2/1979 | Goldner et al. . |
| 4,165,128 | 8/1979 | Strowick et al. . |
| 4,307,913 | 12/1981 | Spiegelhoff . |
| 4,400,033 | 8/1983 | Pietsch . |
| 4,435,011 | 3/1984 | Hakamata . |
| 4,558,901 | 12/1985 | Yokoyama . |
| 4,579,384 | 4/1986 | Sharod . |
| 4,621,864 | 11/1986 | Hill . |
| 4,848,840 | 7/1989 | Toya . |
| 4,946,226 | 8/1990 | Hurn et al. . |
| 5,366,268 | 11/1994 | Miller et al. . |
| 5,462,332 | 10/1995 | Payne et al. . |
| 5,476,307 | 12/1995 | Whalen . |
| 5,556,159 | 9/1996 | Canteleux . |
| 5,658,043 | 8/1997 | Davidson . |

FOREIGN PATENT DOCUMENTS

| | | |
|---|---|---|
| 2707569 | 1/1995 | France . |
| 3539258 | 5/1986 | Germany . |
| 2 127 285 A | 4/1984 | United Kingdom . |

*Primary Examiner*—Milton Nelson, Jr.
*Attorney, Agent, or Firm*—Brooks & Kushman PC

[57] ABSTRACT

An armrest lock is provided for a motor vehicle armrest that is pivotally connected in a motor vehicle through a linkage to permit pivotal movement of the armrest between a raised position and a lowered position. The armrest lock includes a cam pin extending from the linkage. A lock plate is pivotally mounted on the vehicle and includes a cam slot formed therein with first and second slot portions for receiving the cam pin. A spring pivotally biases the lock plate with respect to the vehicle. The lock plate is sufficiently weighted to effect pivotal movement against the spring bias as a result of its own inertia in a sudden deceleration to allow the cam pin to enter the first slot portion to engage the armrest lock to prevent further pivotal movement of the armrest.

9 Claims, 4 Drawing Sheets

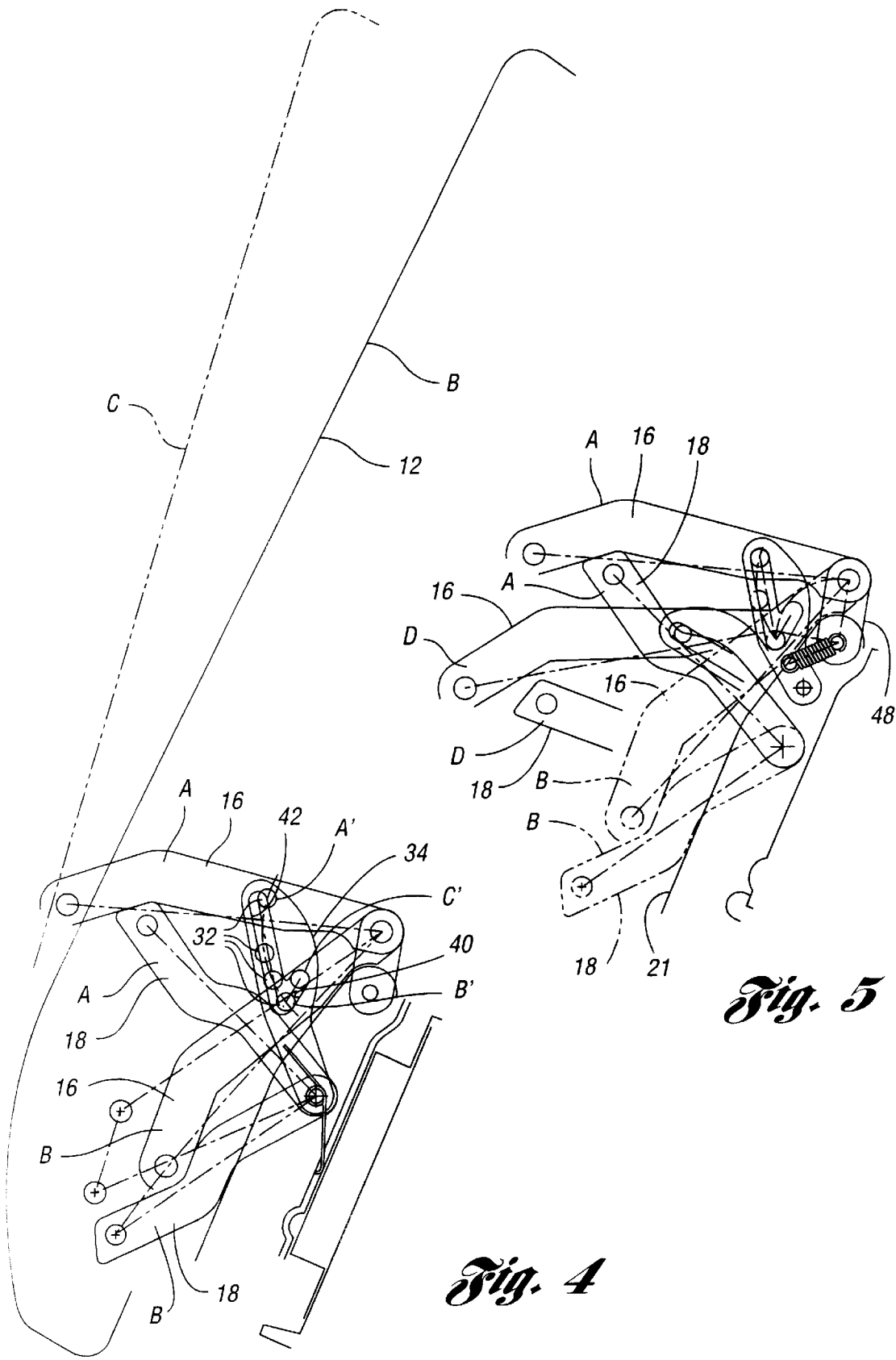

RETARDATION LOCK MEMBER FOR MOTOR VEHICLE SEAT COMPONENT

TECHNICAL FIELD

The present invention relates to a retardation lock member for a motor vehicle seat component, and more particularly to a spring loaded inertia latch for a vehicle seat component, such as an armrest, child restraint seat back, or trunk-access lid.

BACKGROUND OF THE INVENTION

Motor vehicles typically include armrests which are pivotable between raised and lowered positions for the convenience of passengers. When such an armrest is in its raised position, it is desirable to be able to prevent it dropping to its lowered position in the event of a sudden deceleration. A locking mechanism for a motor vehicle armrest is now required in many vehicles.

Typical known armrest locks require release before the armrest can be lowered. However, such a system requires that the potential user of the armrest be acquainted with the manner of operation so as to be able to lower the armrest, and rear seat passengers, for whom armrests are most frequently provided, do not have access to an instruction manual or the inclination to investigate how to release the lock which allows the armrest to be lowered.

Accordingly, there exists a need for freely pivotable armrests which are automatically lockable in an upright position in the event of a sudden deceleration. The same need exists for child restraint seat backs, ski lids, etc.

U.S. Pat. No. 4,579,384 provides an armrest lock for locking an armrest in its raised position as a result of its own inertia in the event of a sudden deceleration of the vehicle. The device includes a freely pivotable latch which engages a projecting rib on an armrest linkage when suddenly decelerated. A problem with such design is that the freely rotating latch may rattle or jam, and a hard deceleration may cause bouncing of the pivotable latch which may prevent the device from latching. Accordingly, it is desirable to provide an inertia latch for vehicle armrest or other seat component which is smoothly operating, reliable and rattle free.

DISCLOSURE OF THE INVENTION

The present invention overcomes the above-referenced shortcomings of prior art armrest latches by providing an armrest lock including a cam pin extending from the armrest linkage and contained within a cam slot formed in a spring-loaded, pivotable lock plate. The cam slot includes first and second slot portions, and is spring-loaded to prevent rattle. This configuration provides a smooth and reliable lock in the event of any sudden deceleration which is sufficient to overcome the spring bias.

More specifically, the present invention provides an armrest lock for a motor vehicle armrest that is pivotally connected to a motor vehicle seat back through a linkage to permit pivotal movement of the armrest between a raised position and a lowered position. The armrest lock includes a cam pin extending from the linkage. A lock plate is pivotally mounted on the seat back and includes a cam slot formed therein with first and second slot portions for receiving the cam pin. A spring pivotally biases the lock plate with respect to the seat back. The lock plate is sufficiently weighted to effect pivotal movement against the spring bias as a result of its own inertia in a sudden deceleration to allow the cam pin to enter the first slot portion to engage the armrest lock to prevent further pivotal movement of the armrest.

Preferably, the second slot portion is sufficiently long to allow full pivotal movement of the armrest between the raised position and the lowered position as the cam pin travels within the second slot portion.

Another aspect of the invention provides a lock member for a motor vehicle seat component that is pivotally connected to a motor vehicle seat back to permit pivotal movement of the seat component between a raised position and a lowered position. The lock member includes a linkage pivotally connecting the seat component to the seat back and having a cam pin extending from the linkage. A lock plate is pivotally mounted to the seat back and includes a cam slot formed therein with first and second slot portions for receiving the cam pin. A spring pivotally biases the lock plate with respect to the seat back. The lock plate is sufficiently weighted to effect pivotal movement against the spring bias as a result of its own inertia in a sudden deceleration to allow the cam pin to enter the first slot portion to engage the lock member to prevent further pivotal movement of the seat component. The motor vehicle seat component may be an armrest, child seat back, ski lid, etc.

Accordingly, an object of the present invention is to provide an inertia latch for a vehicle seat component which is smooth operating, reliable, and rattle free.

A further object of the invention is to provide a vehicle seat armrest lock member including a linkage with a cam pin extending therefrom, and a lock plate with a cam slot formed therein for receiving the cam pin, wherein the lock plate is spring biased for smooth operating, reliable and rattle free locking of the cam pin within the cam slot in the event of a sudden deceleration to pivot the lock plate against the spring bias.

The above objects and other objects, features advantages of the present invention are readily apparent from the following detailed description of the best mode for carrying out the invention when taken in connection with the accompanying drawings.

BRIEF DESCRIPTION OF THE DRAWINGS

FIG. 4 shows a schematically arranged side view of the linkage and lock plate assembly of the present invention illustrating raised and lowered positions of the linkage; and FIG. 5 shows a schematically arranged side view of the linkage and lock plate assembly illustrating various pivoted positions in accordance with the present invention.

DETAILED DESCRIPTION OF THE PREFERRED EMBODIMENT

The preferred embodiment of the present invention is described for use with a vehicle armrest, however, the present invention is also intended for use with a vehicle child restraint seat back, a pivotable trunk-access lid, or other vehicle seat component which is pivotable between upright and lowered positions.

Figure 1:
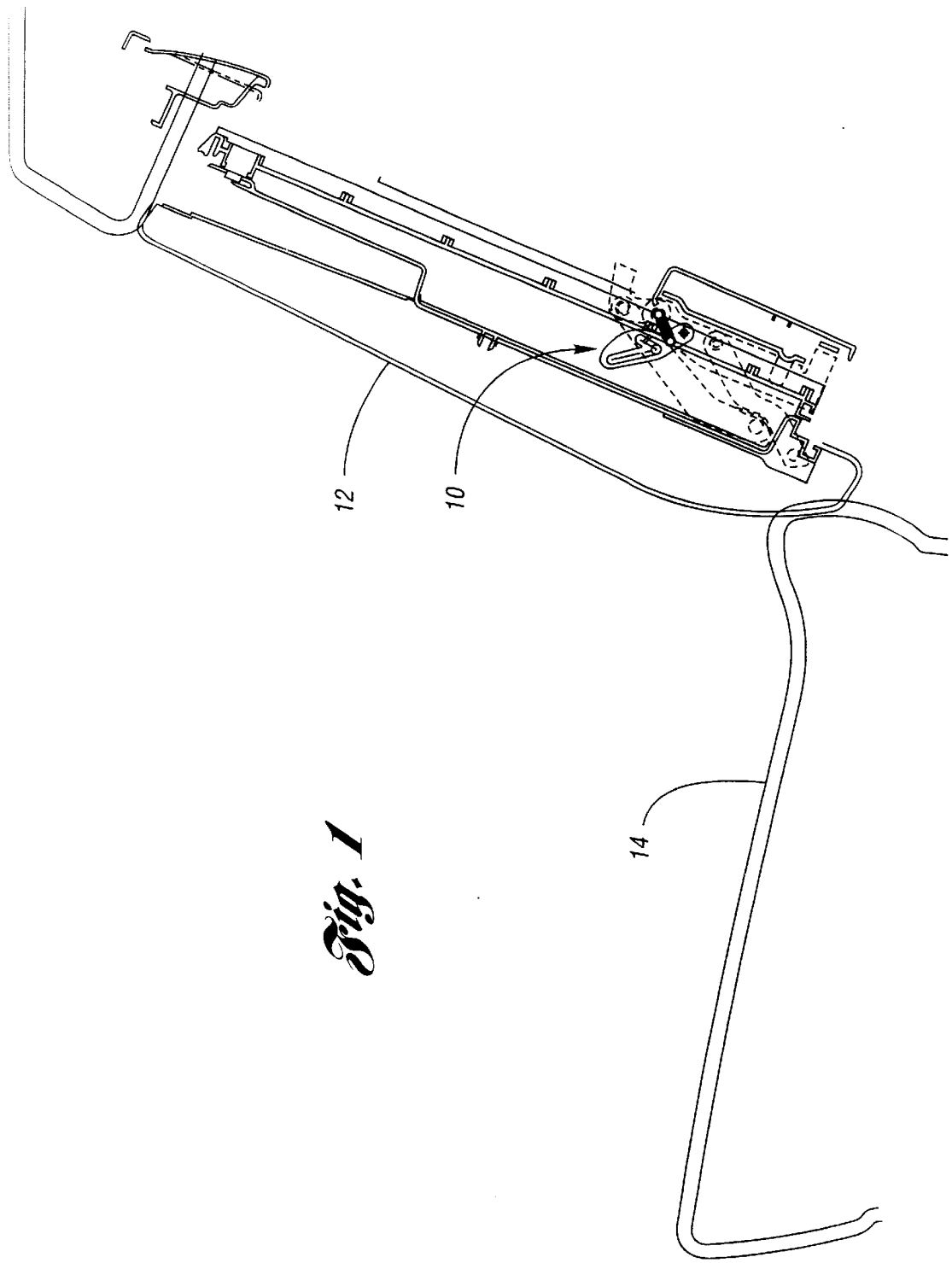
FIG. 1 shows a side view of the vehicle seat armrest assembly incorporating an armrest lock in accordance with the present invention.
Figure 2:
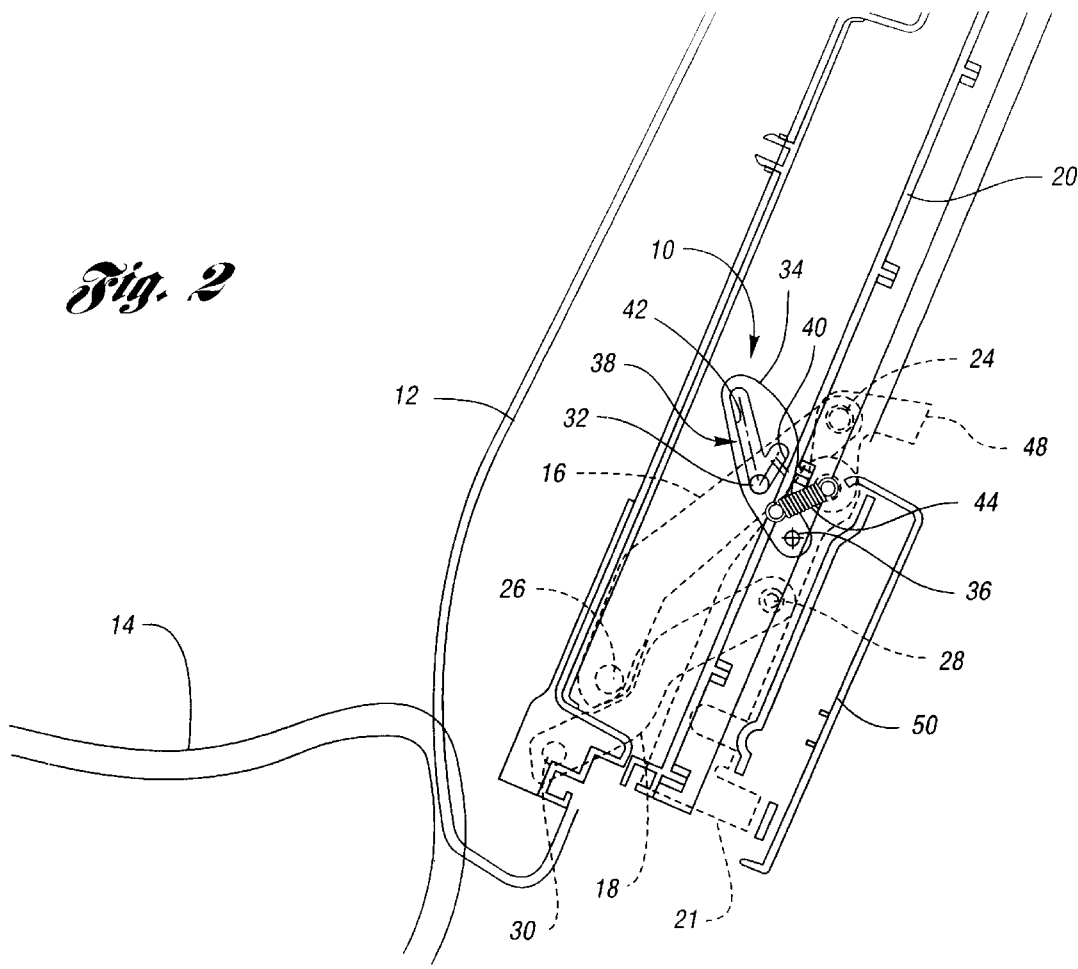
FIG. 2 shows an enlarged side view of the armrest assembly shown in FIG. 1.

Referring to FIGS. 1 and 2, the armrest lock assembly 10 of the present invention is provided for locking pivotal movement of the armrest 12 with respect to the lower seat 14. The upper and lower link arms 16, 18, cooperate to form a linkage to pivotally connect the armrest frame 20 to the pivot bracket 21 to enable pivotal movement of the armrest 12 between the upright position shown in FIG. 2 and the lowered position shown in FIG. 3. Upper link arm 16 and lower link arm 18 are pivotally connected at opposing ends between the armrest frame 20 and the pivot bracket 21 (via link 48), as shown in FIG. 2. The pivot bracket 21 is secured immovably within the vehicle. The upper and lower link arms 16, 18 are connected between the pivot bracket 21 (via link 48) and the armrest frame 20 at pivot points 24, 26, 28, 30, respectively. The function of the link 48 is described later in the detailed description.

The armrest lock assembly 10 includes a cam pin 32 extending from the upper link arm 16. A lock plate 34 is pivotally mounted on the vehicle by means of the pivot joint 36 which pivotally mounts the lock plate 34 to the pivot bracket 21. The lock plate 34 includes a cam slot 38 formed therein with first and second slot portions 40, 42 for receiving the cam pin 32.

A tension spring 44 pivotally biases the lock plate 34 with respect to the pivot bracket 21.

As described below, in normal operation, the cam pin 32 slides within the second slot portion 42 as the armrest 12 is pivoted between the lowered and raised positions. However, in the event of a sudden deceleration, the lock plate 34 pivots about the pivot joint 36 against the bias of the spring 44, which causes the cam pin 32 to slide into the first slot portion 40, which is significantly shorter than the second slot portion 42, which locks the armrest 12 from further pivotal movement in the downward direction. This locking action is accomplished by sufficiently weighting the lock plate 34 to effect pivotal movement against the spring bias as a result of its own inertia in a sudden deceleration to allow the cam pin 32 to enter the first slot portion 40 to engage the armrest lock.

The second slot portion 42 is sufficiently long to allow full pivotal movement of the armrest 12 between the raised and lowered positions as the cam pin 32 travels within the second slot portion.

The upper end of the lock plate 32 normally extends substantially vertically in the vehicle as a result of the bias of the spring 44 which tends to rotate the lock plate 34 clockwise, as viewed in FIG. 2, about the pivot joint 36. Accordingly, the spring bias causes the cam pin 32 to travel within the second slot portion 42 under normal operating conditions because of the clockwise bias of spring 44 on the lock plate 34.

Figure 3:
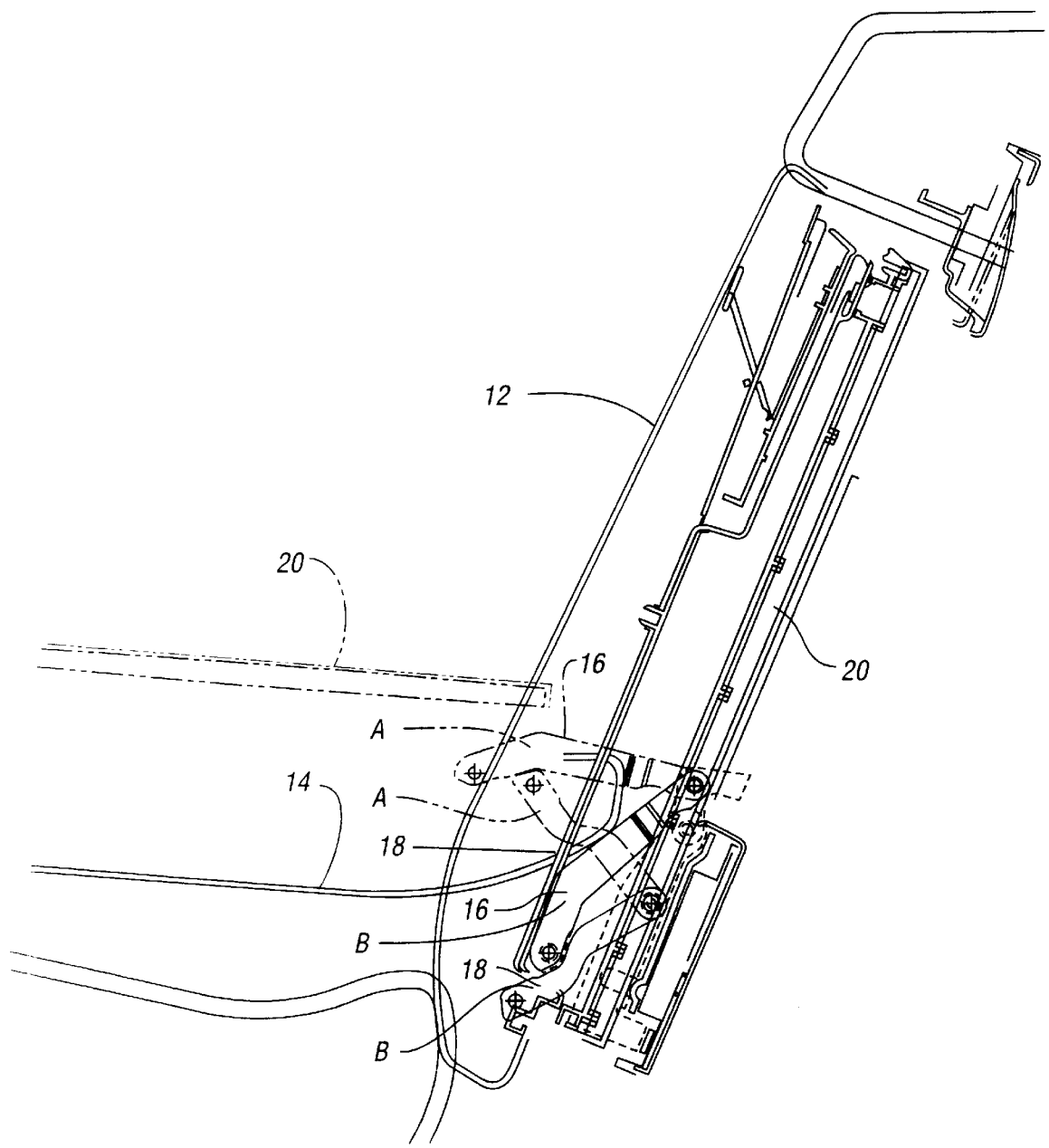
FIG. 3 shows a schematically arranged side view of the vehicle seat armrest assembly of FIG. 1 illustrating raised and lower positions of the linkage arms.

FIG. 3 illustrates the pivotal movement of the upper and lower link arms 16, 18 as the armrest is pivoted between the lowered and raised positions. Position A of the upper link arm 16 and lower link arm 16 is representative of the armrest 12 being in the lowered position. Position B of the upper link arm 16 and lower link arm 18 is representative of the armrest being in the upright position. The armrest 12 is freely pivotable between the two positions as the upper and lower link arms 16, 18 pivot between positions A and B, and the cam pin 32 slides within the second slot portion 42 of the lock plate 36 under normal operating conditions.

FIG. 4 illustrates the sequence of movement of the cam pin 32 within the second slot portion 42 of the lock plate 34 as the upper and lower link arms 16, 18 pivot between positions A and B as the armrest is pivoted. When the armrest is in the down position, the upper and lower link arms 16, 18 are in position A, and the cam pin 32 is at position A' at the top of the second slot portion 42. As the armrest is pivoted to the raised position, the link arms 16, 18 move from position A to position B, and the cam pin 32 travels along the second slot portion 42 to position B'. At this point, the armrest 12 is in the upright position.

In the event of a sudden deceleration in this position when the cam pin is at position B', the inertia of the lock plate 34 will stretch the spring 44 (shown in FIG. 2) as the lock plate 34 rotates counterclockwise, which causes the cam pin 32 to slide along the first slot portion 40 from position B'to position C' at the end of the first slot portion 40 shown in FIG. 4. Accordingly, with the cam pin 32 at position C' within the first slot portion 40, the arm rest 12 has pivoted forward from position B to position C shown in phantom in FIG. 4, and is prevented from further pivotal movement by means of the locking of the cam pin 32 within the end of the first slot portion 40 of the lock plate 34.

FIG. 5 illustrates the same pivotal movement of the link arms 16, 18 between positions A and B as shown in FIG. 4, but also adds capacity for additional movement by illustrating pivotal movement of the ski lid bracket link 48 with respect to the pivot bracket 21.

This ski lid bracket link 48 is also shown in FIG. 2, and facilitates pivotal movement of the ski lid 50, which allows access from the passenger compartment into the vehicle trunk when opened. As illustrated in FIG. 5, with the upper and lower link arms 16, 18 in position D, the ski lid 50 is in the open position, and the armrest is in the down position. Accordingly, the armrest lock assembly 10 of the present invention is further advantageous in that it allows such additional pivotal motion for cooperation with an adjacent moveable component, such as the ski lid 50. Even with this extra linkage 48, the inertia lock described herein is still operative when the armrest 12 is in the upright position.

While the best mode for carrying out the invention has been described in detail, those familiar with the art to which this invention relates will recognize various alternative designs and embodiments for practicing the invention within the scope of the appended claims.

What is claimed is:

1. A lock member operatively attached to a motor vehicle seat component that is pivotally connected in a motor vehicle through a linkage to permit pivotal movement of the seat component between a raised position and a lowered position, wherein the lock member comprises:

a cam pin extending from one of the linkage and the vehicle;

a lock plate pivotally mounted on the other of the linkage and the vehicle and having a cam slot formed therein with first and second substantially straight slot portions extending at an acute angle relative to each other for receiving the cam pin; and a spring continuously pivotally biasing the lock plate with respect to said other of the linkage and the vehicle;

wherein the lock plate is sufficiently weighted to effect pivotal movement against the spring bias as a result of its own inertia in a sudden deceleration to allow the cam pin to enter the first slot portion to engage the lock member to prevent further pivotal movement of the seat component.

2. The lock member of claim 1, wherein said seat component is an armrest, and the second slot portion is sufficiently long to allow full pivotal movement of the armrest between the raised position and lowered position as the cam pin travels within the second slot portion.

3. A lock member operatively attached to a motor vehicle seat component that is pivotally connected in a motor vehicle to permit pivotal movement of the seat component between a raised position and a lowered position, the lock member comprising:

a linkage pivotally connecting the seat component in the vehicle and having a cam pin extending from the linkage;

a lock plate pivotally mounted to the vehicle and having a cam slot formed therein with first and second substantially straight slot portions extending at an acute angle relative to each other for receiving the cam pin; and a spring continuously pivotally biasing the lock plate with respect to the vehicle;

wherein the lock plate is sufficiently weighted to effect pivotal movement against the spring bias as a result of its own inertia in a sudden deceleration to allow the cam pin to enter the first slot portion to engage the lock member to prevent further pivotal movement of the seat component.

4. The lock member of claim 3, wherein said lock plate comprises a first end pivotally connected to the vehicle, with the spring connected to the lock plate between the first end and the cam slot, and wherein said lock plate comprises a second end normally extending substantially vertically in the vehicle and sufficently weighted to effect said pivotal movement against the spring bias.

5. The lock member of claim 3, wherein the spring normally biases the lock plate such that the cam pin travels in the second slot portion as the seat component is pivotally moved between the raised position and the lowered position.

6. The lock member of claim 3, wherein the linkage comprises first and second link arms, each link arm being independently pivotally connected to both the vehicle and the pivotable seat component.

7. The lock member of claim 3, wherein the seat component comprises an armrest.

8. The lock member of claim 7 wherein the second slot portion is sufficiently long to allow full pivotal movement of the armrest between the raised position and lowered position as the cam pin travels within the second slot portion.

9. An armrest lock operatively attached to a motor vehicle armrest that is pivotally connected in a motor vehicle through a linkage to permit pivotal movement of the armrest between a raised position and a lowered position with respect to a seat back, wherein the armrest lock comprises:

a cam pin extending from the linkage;

a lock plate pivotally mounted on the motor vehicle and having a cam slot formed therein with first and second substantially straight slot portions extending at an acute angle relative to each other for receiving the cam pin;

a spring continuously pivotally biasing the lock plate with respect to the seat back;

wherein the lock plate is sufficiently weighted to effect pivotal movement against the spring bias as a result of the lock plate's own inertia in a sudden deceleration to allow the cam pin to enter the first slot portion to engage the armrest lock to prevent further pivotal movement of the armrest; and wherein the second slot portion is sufficiently long to allow full pivotal movement of the armrest between the raised position and lowered position as the cam pin travels within the second slot portion.

* * * * *